Aug. 28, 1934.                O. THIEME                1,971,544
                COMBINED TYPEWRITING AND COMPUTING MACHINE
                Filed June 18, 1928        8 Sheets-Sheet 1
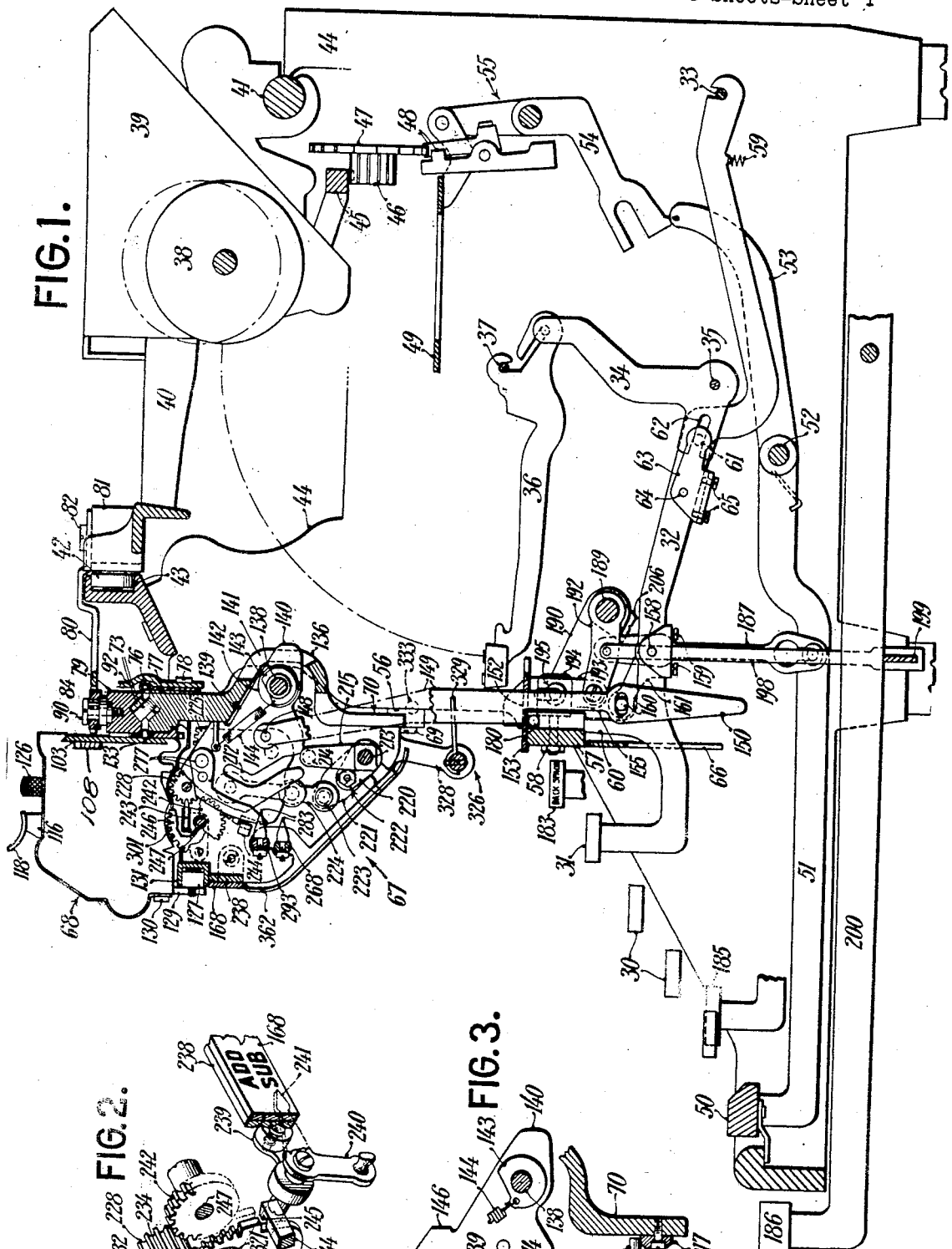
INVENTOR:
Otto Thieme
BY B.C. Stickney
ATTORNEY.

Aug. 28, 1934.  O. THIEME  1,971,544
COMBINED TYPEWRITING AND COMPUTING MACHINE
Filed June 18, 1928    8 Sheets-Sheet 2

INVENTOR:
Otto Thieme
BY B.C. Stickney
ATTORNEY

Aug. 28, 1934.            O. THIEME            1,971,544
COMBINED TYPEWRITING AND COMPUTING MACHINE
Filed June 18, 1928      8 Sheets-Sheet 4
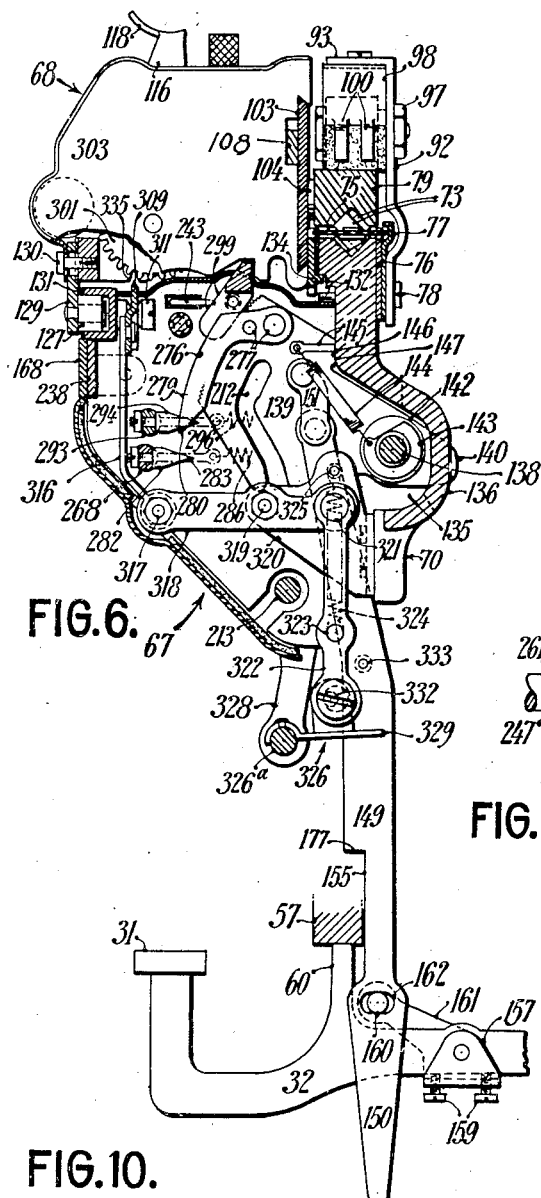
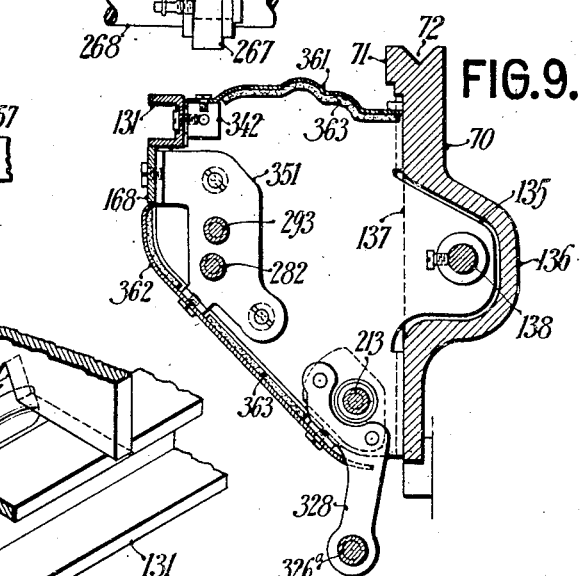
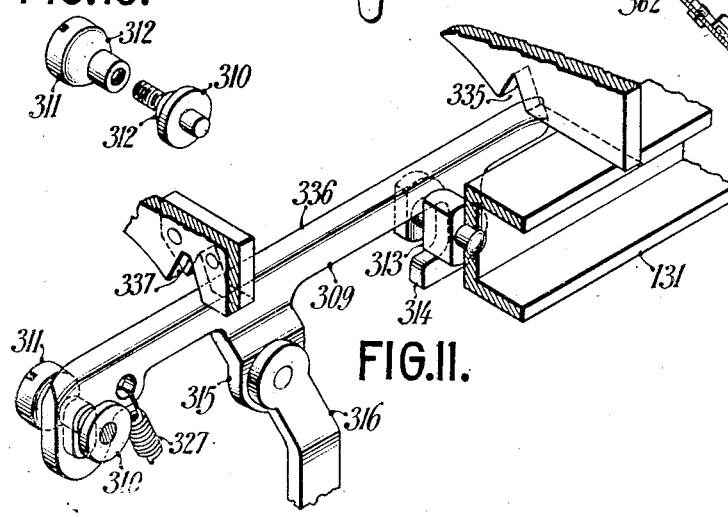
INVENTOR:
Otto Thieme
BY B.B. Stickney
ATTORNEY.

Aug. 28, 1934.     O. THIEME     1,971,544
COMBINED TYPEWRITING AND COMPUTING MACHINE
Filed June 18, 1928     8 Sheets-Sheet 5
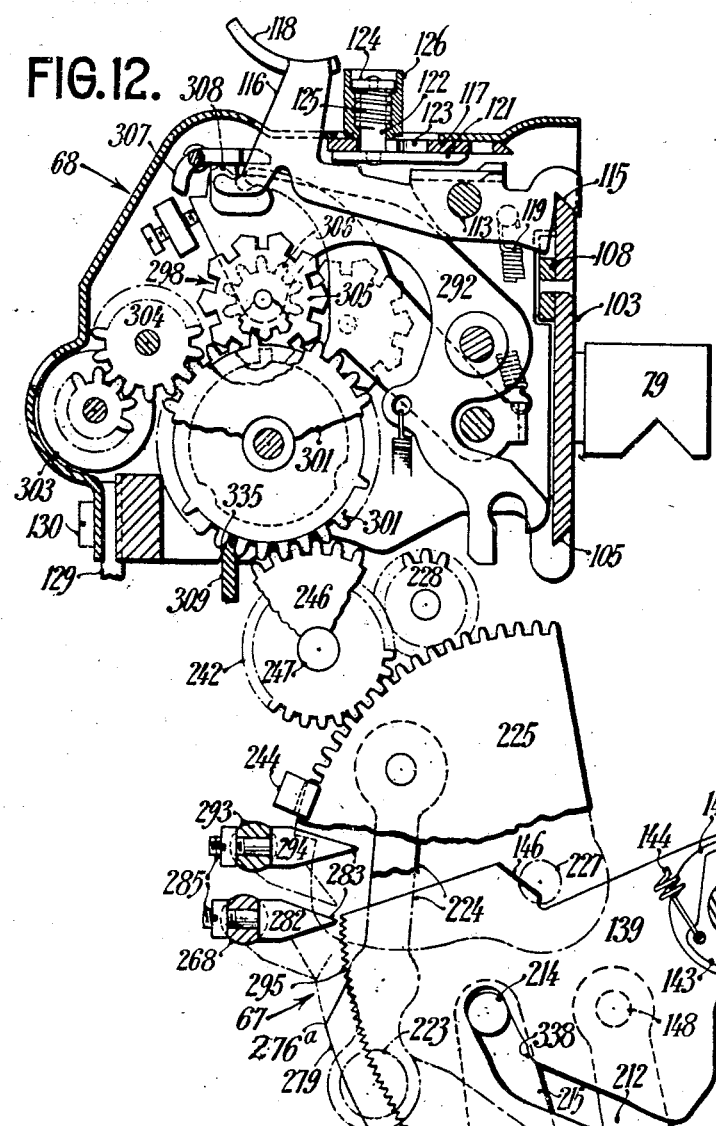
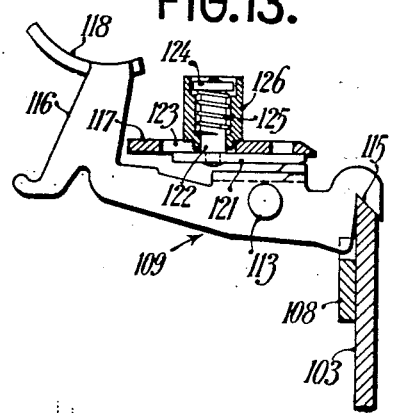
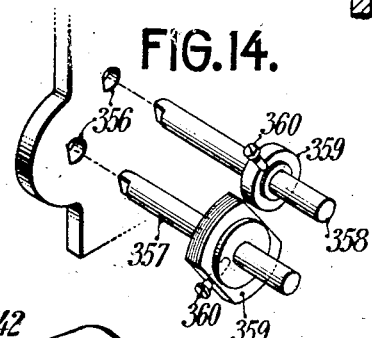
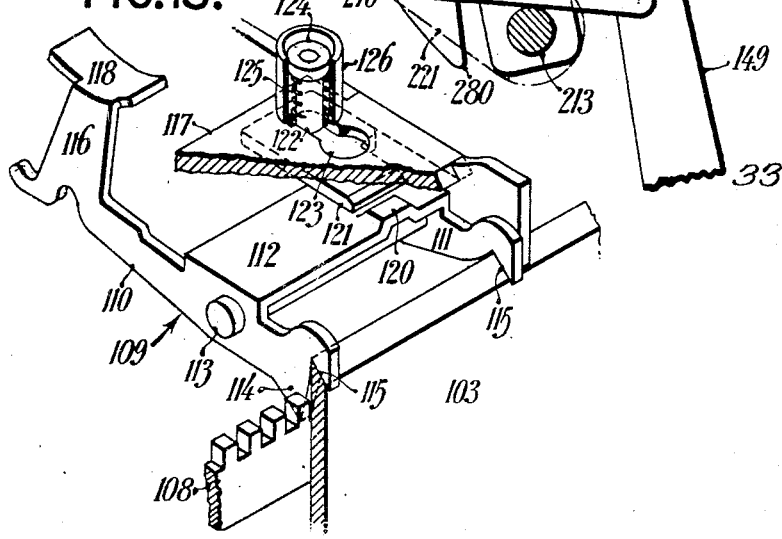
INVENTOR:
Otto Thieme
BY B.C. Stickney
ATTORNEY.

Aug. 28, 1934. O. THIEME 1,971,544
COMBINED TYPEWRITING AND COMPUTING MACHINE
Filed June 18, 1928  8 Sheets-Sheet 6
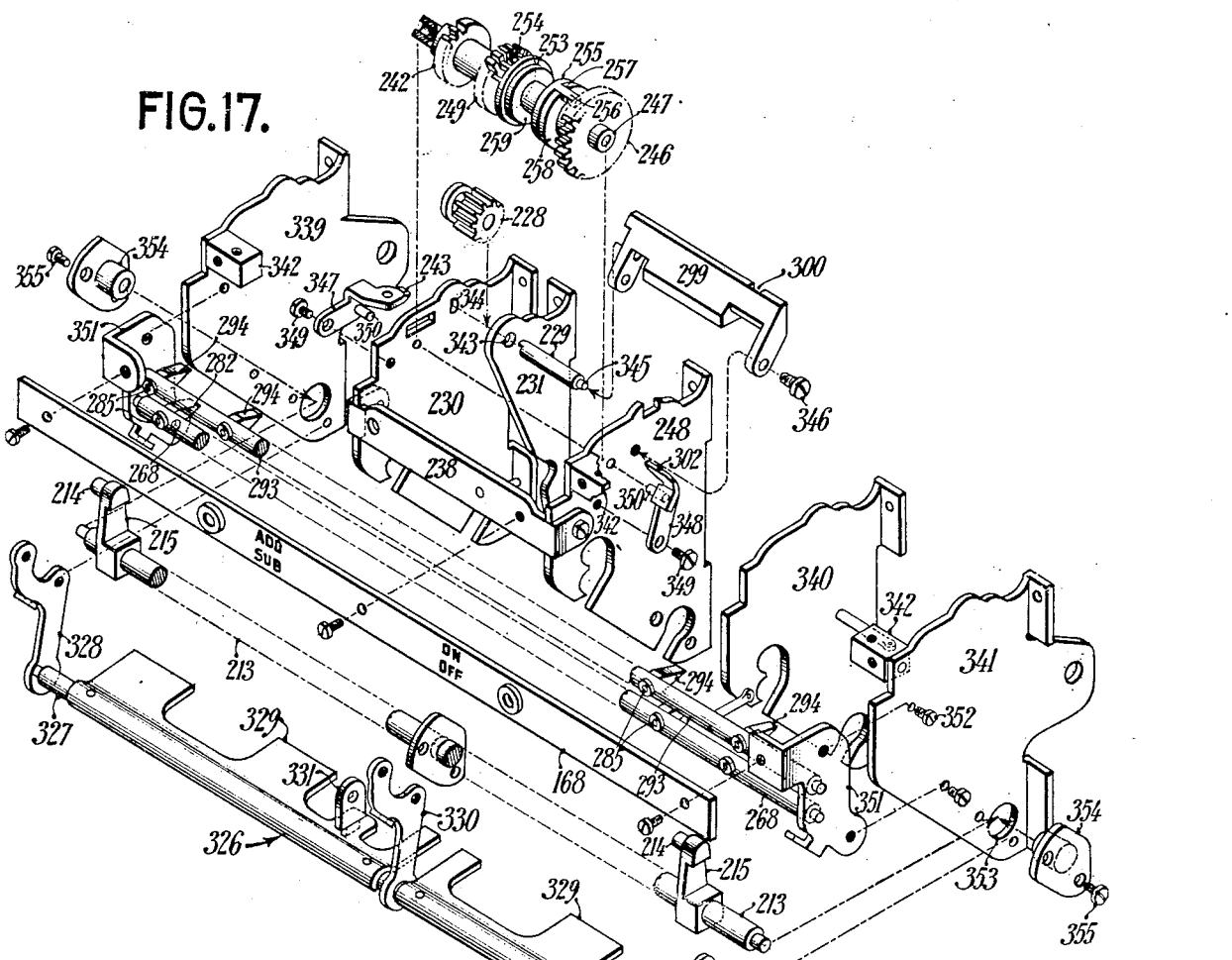
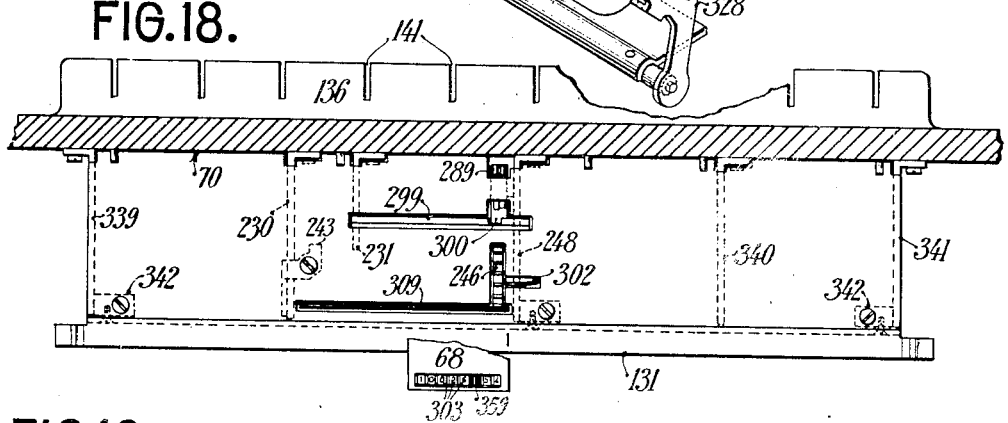
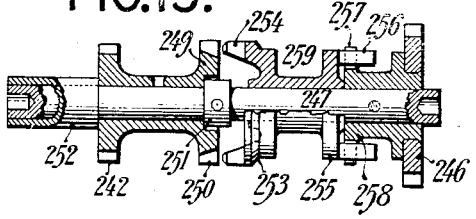
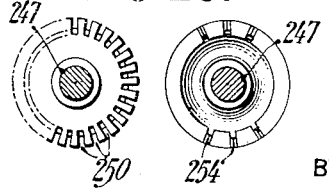
INVENTOR:
Otto Thieme
BY B. C. Stickney
ATTORNEY.

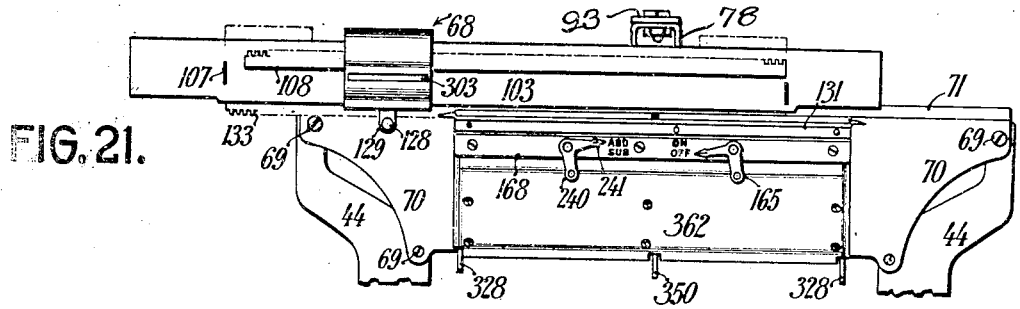
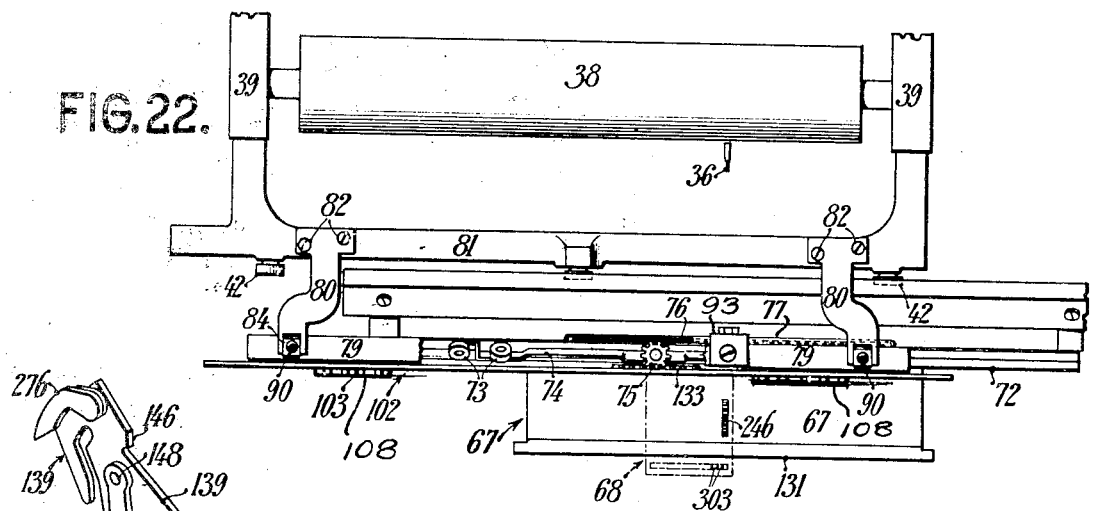
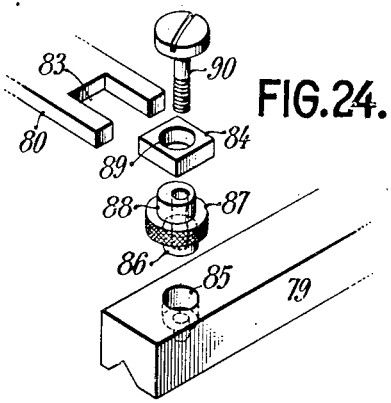
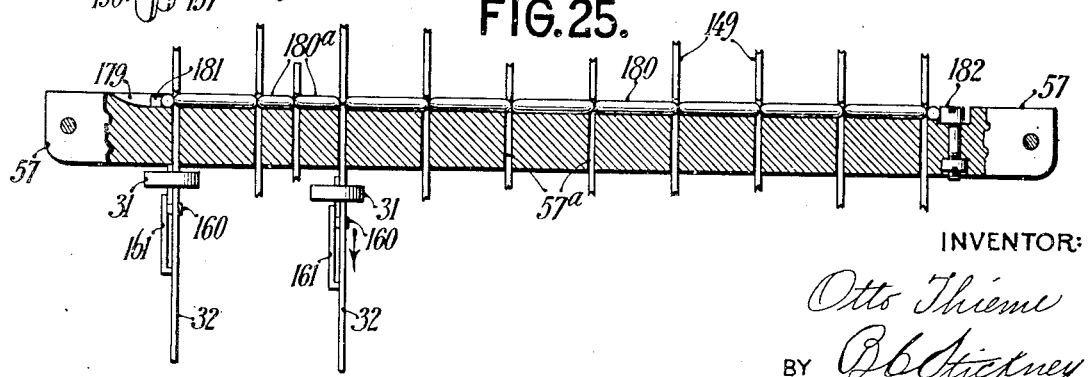

Aug. 28, 1934.                    O. THIEME                    1,971,544
COMBINED TYPEWRITING AND COMPUTING MACHINE
Filed June 18, 1928          8 Sheets-Sheet 8
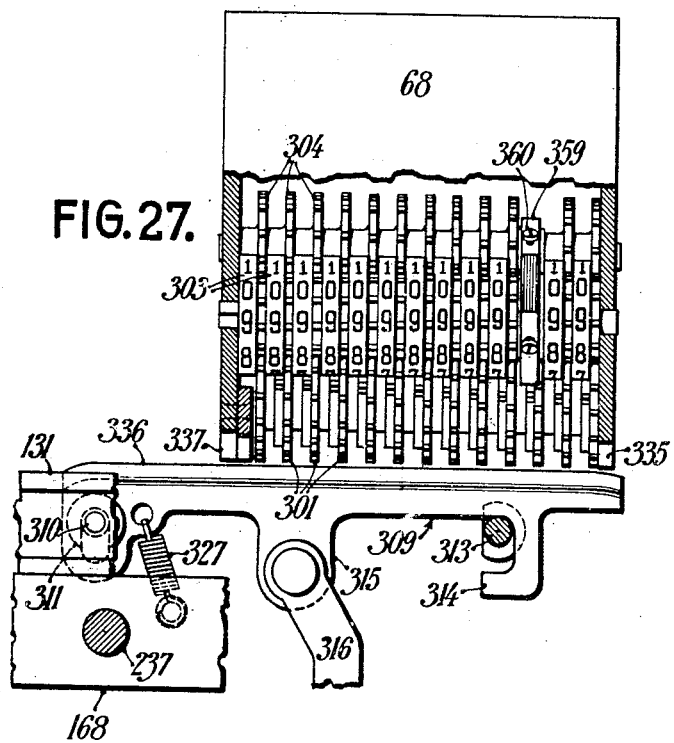
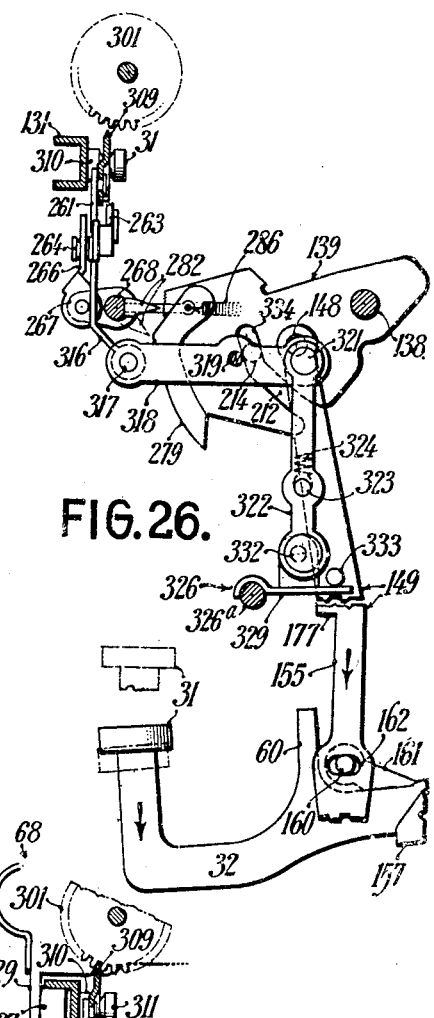
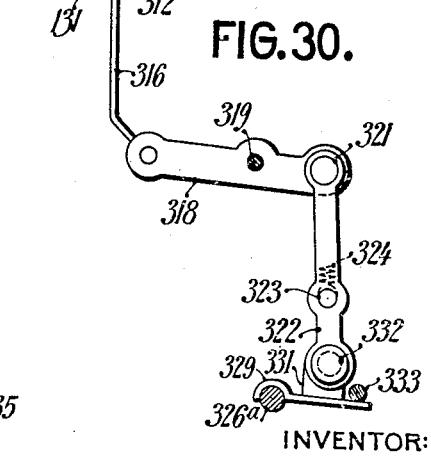
INVENTOR:
Otto Thieme
BY O. b. Stickney
ATTORNEY.

Patented Aug. 28, 1934

1,971,544

UNITED STATES PATENT OFFICE 1,971,544

COMBINED TYPEWRITING AND COMPUTING MACHINE

Otto Thieme, Hartford, Conn., assignor, by mesne assignments, to Underwood Elliott Fisher Company, New York, N. Y., a corporation of Delaware Application June 18, 1928, Serial No. 286,218

25 Claims. (Cl. 235—59)

This invention relates to combined typewriting and computing mechanisms of that class where demountable totalizing units are adjustably secured to the traveling carriage of the typewriter and operated by a stationary actuating mechanism connectible to the numeral and other keys of the typewriter, and the present invention may be regarded as an improvement upon the construction shown in the pending application of Alfred G. F. Kurowski, filed March 12, 1926, Serial No. 94,181 (now Patent No. 1,876,696, dated September 13, 1932).

One feature of the present invention includes such improvements in the Kurowski design found to be necessary to reduce the number of parts and the cost of production of the parts, to facilitate the grouping of the parts into sub-assemblies for stock-units, to increase the efficiency and durability of co-operative parts, to provide accessible adjustments for groups of parts so essential to compensate for variations in a manufactured product, and to establish the co-operation of the separate stock-units, whereby the final assembly of the mechanisms by skilled labor is one progressive chain of labor-saving movements.

Other features provide an improved manner of assembling the totalizer truck to be driven by the typewriter-carriage; and the stabilizing of the totalizer-truck bearings, when the truck overhangs the stationary bearing rail at each extreme end of the typing line.

Still other features are to insure the carrying over of each digit-wheel by mechanically overthrowing the normal carry-over position, then retracting to the true carry-over position, and thus compensating for the slack and resistance in a long one-way driving train that otherwise might incompletely carry over to the wheel of next higher denominational order; to provide spring-restored totalizer-actuating cams that are self-supporting at a normal position and independently of their key-levers; to provide a non-adjustable connection for driving each actuating cam with disconnectible adjustable means intermediate each connection and its numeral key-lever; to provide a non-compute control operative to disconnect the cam-driving connections from their numeral-keys, and thus restore the normal touch to the numeral-keys when typing numerals without computing; to provide a digit-wheel aligning bar operative at the end of a key-stroke to straighten out the spirality in an extraordinarily long series of digit-wheels; to condition this aligning bar for a floating suspension to render said bar self-aligning to either an additive or a subtractive spirality in the series of digit-wheels and convey a shearing motion to the bar that is first effective on the wheel of the lowest denomination and then is progressively effective upon the wheels of higher denominations; to provide a non-compute connection universally operative by a non-compute key, a back-space key or a case-shift key to silence the computing mechanism; to provide dust-removing wipers stationary with the frame to wipe over a roller-engaging face on the carriage-fed totalizer-carrying truck; to prevent the changing of the computive state of the master-gear during the depression of a numeral-key; and to provide adjusting means intermediate each type-bar and its numeral-key-lever and an individual adjustment between the computing mechanism and the same key-lever, whereby the joint actuation of both mechanisms can be mechanically synchronized without the usual pronging mutilation of the key-levers and a realignment of the keys.

Other features and advantages will hereinafter appear.

In the accompanying drawings,

Figure 1 is a vertical section through an Underwood typewriting machine, showing a totalizer mounted upon a truck movable with the typewriter-carriage, a totalizer-actuating mechanism at the front of the machine-frame with the associated typewriter parts connected thereto.

Figure 2 is an enlarged view, in perspective, of the shift-gears that determine the computive state of the master-gear.

Figure 3 is a detail view of the manner for timing the co-operation of two totalizer-actuating members.

Figure 6 is a full-size side elevation of a totalizer, and a sectional view of the totalizer-actuating mechanism and connections to a numeral-key.

Figure 7 is a view similar to Figure 6 with the side wall of the totalizer and actuator broken away to expose other parts not disclosed in Figure 6.

Figure 8 is an enlarged front view of the master-gear clutch-operating connections.

Figure 9 is a sectional view through the actuator casing, showing the manner of lining the cover-plates of the casing with sound-deadening material.

Figure 10 is a detail view of the pivot that provides the floating motion for the digit-wheel aligning bar.

Figure 11 is a perspective view of the digit-wheel aligning bar and the co-operative parts.

Figure 12 is an enlarged vertical section through the totalizer, and a diagrammatic assembly of the operative train of mechanisms between the totalizer and a fully depressed numeral-key.

Figure 13 is an enlarged detail view of the totalizer locking means.

Figure 14 is an enlarged view, in perspective, showing the method of assembling one end of two rods to the totalizer side frame upon which are assembled the digit-wheels and their intermediate gears.

Figure 15 shows the totalizer locking means in perspective.

Figure 16 is a detail operational view, showing the overthrowing action of an actuating sector upon its crank-arm to compensate for slack in a long series of carry-over mechanisms.

Figure 17 is a full size detail perspective view of a series of disassembled co-operative parts, each part having lead lines to its assembled position relatively to the other parts, and illustrates a labor-saving method for the progressive assembly of the parts.

Figure 18 is a plan view of the actuator case with the totalizer removed.

Figure 19 is an enlarged view, partly in section, showing the relative assembly of the master-gear and its driving clutch-members upon the shaft, as for a stock-unit.

Figure 20 is face views of the two clutch-elements that drive the master-gear.

Figure 21 is a reduced front elevation of the actuator, the truck and the totalizer, showing the relative limits for the adjustment of the totalizer to the truck to be co-operative with the actuating mechanism.

Figure 22 is a reduced plan view of the carriage front rail, the truck and the actuator, and also showing the roll separator control for the truck-bearings.

Figure 23 is a detached view, in perspective, of the parts operated by the case-shift key to disconnect the totalizer-actuating mechanism from the numeral-key levers.

Figure 24 is detail views in vertical suspension, to illustrate their relative assembly to the carriage-driven truck-rail to co-operate with the carriage-arms.

Figure 25 illustrates a manner for preventing the simultaneous depression of two keys.

Figure 26 shows a connected train of mechanisms in full lines, as when the totalizer-actuating mechanism has completed its digit-registering movement, and the further depression of the key to the lower dotted position operates to elevate the digit-wheel aligning bar to remove any spirality that may develop in the digit-wheels.

Figure 27 is a front elevation of a totalizer with the front wall broken away to expose the digit-wheels and their driving gears, with the digit-wheel aligning bar in lowered or normal position.

Figure 28 shows some of the gears of Figure 26 with the aligning bar partially raised to a tooth-aligning position for the gear of lowest denomination.

Figure 29 shows the aligning bar raised from the position of Figure 28 to a full height, as at the end of a full key-stroke.

Figure 30 is an end view, showing the parts of Figure 26 positioned as when the numeral-key-lever is depressed to the lower dotted position of that figure.

Figure 4:
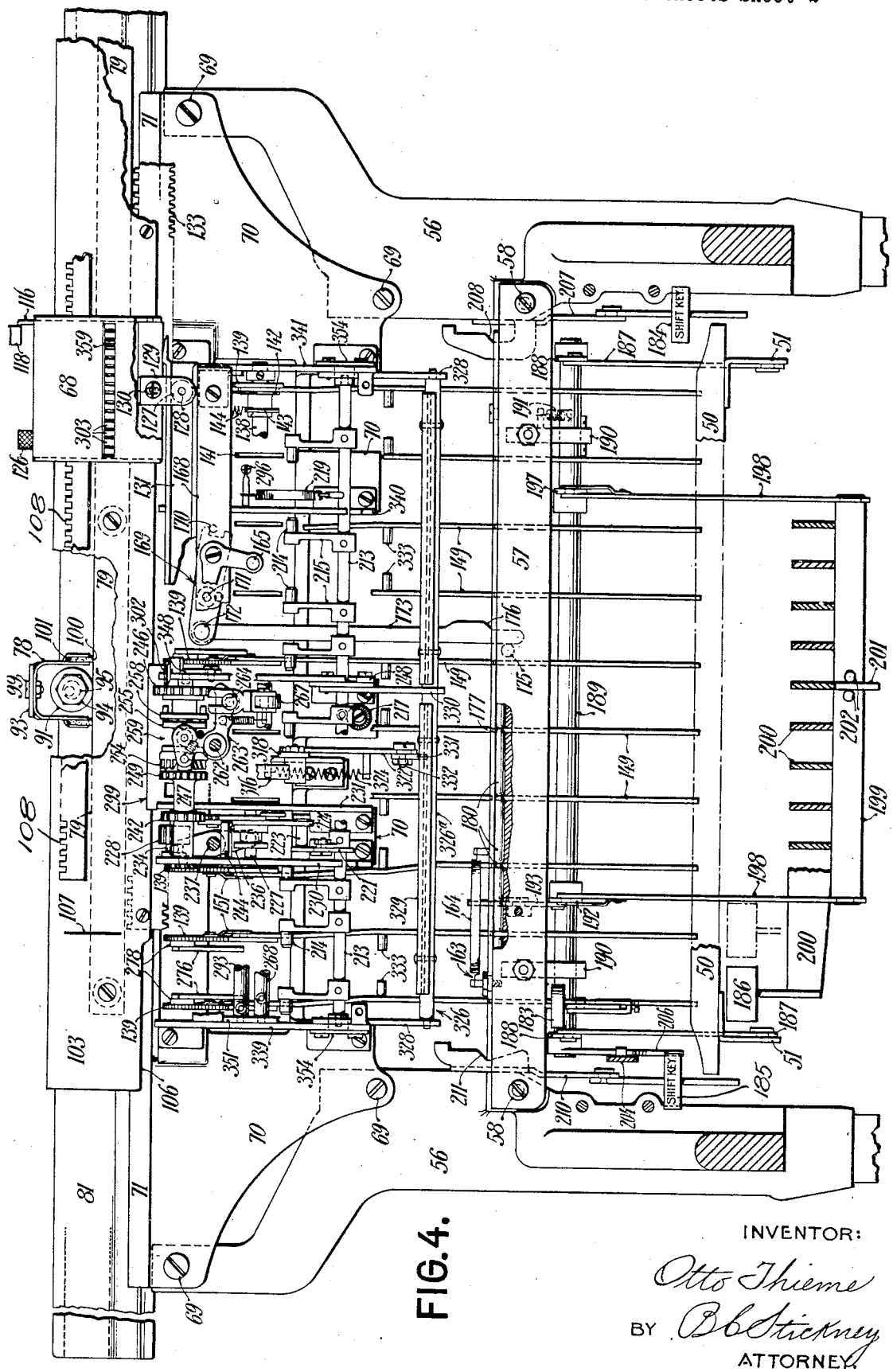
Figure 4 is a front elevation with some of the parts omitted and other parts shown in section for clearness.

The Underwood typewriting machine includes alphabet-keys 30 and numeral-keys 31, which, when depressed, operate key-levers 32 extending rearwardly to fulcrum upon a pivot-wire 33 to vibrate a bell-crank 34 swingable about a fulcrum-wire 35, to vibrate a type-bar 36 radially swingable about a curved fulcrum-wire 37, to strike the front face of a platen 38 mounted to rotate within a platen-frame 39, case-shiftable within a carriage 40 movable upon a carriage-guiding rod 41, and further provided with a center roll 42 to run upon a track 43 at the front of the machine-frame 44. The carriage 40 has a feed-rack 45 in train with a pinion 46 that drives an escapement-wheel 47 operative through a carriage-motor, not shown, to effect letter-spacing movements of the carriage by escapement-dogs 48 vibrated by a universal bar 49 driven rearwardly through the impact of each type-bar in typing. Letter-spacing may also be effected by the usual space-bar 50 connecting the front ends of two levers 51 joined to a spring-pressed rock-shaft 52 having an arm 53 extending rearwardly to engage an extension 54, forming a part of an escapement-rocker 55.

Front posts 56, forming a part of each side frame of the machine, are bridged by a bar 57 secured thereto by a screw 58 at each end of the bar, and positioned horizontally over the whole series of key-levers. The lower face of this bar may be machined to provide a clean, level stop-face to arrest and determine a normal position for the key-levers under the tension of their springs 59, and each key-lever may be formed with a stop-arm 60 to abut this stop-face. In this manner a horizontal alignment of each bank of keys will be assured.

Heretofore, the assembly of each key-lever 32, bell-crank 34 and type-bar 36 required justifying operations to enable the type-bars to rest easily upon a pad and the key-levers to engage their stop-pad under tension. This was accomplished by "pronging" the key-levers and the key-stems to free the type-bar and effect horizontal alignment for the keys. The operation of "pronging" is a mutilating operation, and the present improvement provides means to eliminate it.

Instead of connecting each bell-crank 34 directly with its key-lever by a fixed pin-and-slot connection as heretofore, a pin 61 that engages a slot 62 in the bell-crank is carried by a clip or carrier 63 rockably mounted upon the key-lever for a cradling movement about a pivot 64, and provided with two set screws 65 to bear on the edge of the key-lever on either side of the pivot 64. In this manner accessible adjusting screws rock the pin 61 to a position where the type-bar rests lightly upon its pad, and the full tension of the key-lever spring holds the lever against its stop-face on the bar 57, and no pronging of the key-levers is required except sometimes, to free them within a front comb 66 of the machine.

The computing mechanism may be divided into two mechanisms, an actuator-mechanism 67, fixed to the machine-frames, and a totalizer-mechanism 68 movable with the carriage 40, see Figures 1 and 4. The actuator-mechanism is assembled as a unit and secured to the machine-frame as a unit by screws 69 that pass through an actuator-frame 70 to thread into the front face of the two side frames of the machine. The frame preferably is cast with a rail-section 71 along the upper edge, through which a V-shaped groove 72 is machined to provide bearing faces for two pairs of rolls 73 separated by a carrier 74 (Figures 6 and 22) controlled by a pinion 75 of usual construction in train with a stationary toothed rack 76, which, in the present design, is secured to the rear face of the frame 70 and covered by a dust-shield 77, both rack and shield held in position by screws 78.

A rail 79 having an inverted V-shaped raceway to ride upon the rolls 73, is driven to and fro by connections with a pair of arms 80, one arm secured at each end of the front rail 81 of the carriage-frame 40 by screws 82, Figure 22.

The forward end of each arm may be bifurcated at 83, to provide housings for blocks 84, see Figure 24, that have a close, sliding fit within the housings. To render the blocks operative to adjust the rail 79 longitudinally, each end of the rail may be counterbored at 85 to receive a hub 86 of a knurled head 87 which rests upon the face of the rail. The head 87 is further provided with a hub 88 eccentric with the head 87 which enters a hole 89 in the block 84. With this construction the hub 86 is dropped into the counterbored hole 85, the block 84 dropped over the hub 88, and when so assembled the relation of the parts is such that a large headed screw 90, passing through the head 87 and threaded into the rail, binds said head to the rail 79 and binds said block to the head for a permanent adjustment of the block within its housing 83.

To maintain the rail 79 in proper engagement with the anti-friction rolls 73 and also to prevent the rocking of the rail forwardly and rearwardly upon the rolls, a center roll 91, see Figures 4 and 7, having a face approximately as wide as the top face of the rail, is pivotally mounted upon the front face of a bracket 92 to overhang the rail and roll upon the top face thereof, the wide face of the roll 91 operating to prevent rocking of the rail upon the rolls 73 as an axis. The bracket 92 may be secured to the rear face of the frame as by the screws 78, and the upper end bent forwardly to form an ear 93. The pivot for the roll 91 includes a head 94, a shank 95, and a shouldered-down threaded end 96 to pass through the bracket 92 to be locked by a nut 97, the roll having a running-fit upon the shank between the head 94 and the face of the bracket. To determine the extent of rolling tension between the roll 91 and the face of the rail 79 the threaded end 96 is formed eccentric to the shank-section 95, so that by loosening the nut 97 and applying a wrench to the head 94 the shank may be turned for a fine adjustment of the roll and held in adjusted position while the nut 97 is reset.

To prevent dust or erasings on the upper face of the rail 79 interfering with the closely-adjusted roll 91, means are provided to sweep the face of the rail on either side of the roll. This means includes a metal-formed cage 98 secured to the ear 93 by a screw and a nut 99, the cage having depending sides, with the lower ends thereof slitted and offset, see Figure 6, to form gripping tongues 100 to hold felt-sections 101 within the edges thereof to bear against the face of the rail and serve as dust wipers for the roll 91.

The rail 79 is a carrying medium for a computing mechanism to travel with the carriage, and when provided with means for carrying a series of totalizers, it becomes a traveling truck 102 upon which each totalizer may be adjustably secured to establish a computing zone in passing through a stationary actuating mechanism. To this end, the rail 79 has permanently secured to the front face thereof, a totalizer-carrying flat bar 103 separated from the rail by spacing washers 104 and having each longitudinal edge beveled to dovetail within V-shaped ways 105 formed in the rear edge of each side wall of the totalizer-casing. To provide for the assembly of the totalizer upon the bar, the lower left-hand edge, as indicated at 106 in Figure 4, is removed, and a limit leftward where the totalizer becomes operative to compute may be indicated by a line 107 on the face of the bar 103 for alignment of the left-hand side wall of the totalizer.

The bar 103 has permanently fixed to its front face and parallel with its upper edge, a rack 108, see Figure 12, having spaced-off teeth equivalent to the letter-spacing of the carriage-rack 45. This rack 108 provides a well-known means for locking the totalizer to the bar 103 at letter-space intervals by a spring-pressed manually-released locking frame 109 within each totalizer.

Each locking frame 109 may be formed from a blank, see Figure 15, to provide two vertical sides 110 and 111 joined by a horizontal cross-bar 112, the overall width of the frame being equal to the inner width of the totalizer-casing, and the frame may be vibrated about or with a fulcrum-pin 113 without side play. The side 110 terminates at a dogging tongue 114 to enter any gap between the teeth of the rack 108 and a beveled face 115 to hook over the top edge of the bar 103. The side 111 has a similar beveled face 115 but no rack dogging tongue. The side 110 may be formed with a stem 116 to pass through a clearance hole in the top plate 117 of the totalizer-casing, to carry a release-key 118 by which the frame may be vibrated against a restoring spring 119. The cross-bar 112 may be upset at 120 to provide a raised face to co-operate with a draw-bar 121 that fills the space between said face and the inside face of the top plate 117 of the totalizer-casing to prevent displacement of the totalizer from the truck.

Before the key 118 can be depressed to withdraw the tongue 114 from the rack-teeth and release the totalizer, the bar 121 must be withdrawn from the face 120. To control this movement of the bar 121 a stud 122 fast to the bar projects through an opening 123 in the totalizer-casing where the free end is provided with a head 124 to retain a compression-spring 125 coiled about the stud between the head and the lower recessed end of a sleeve 126. When the bar 121 is withdrawn from the face 120, as shown at Figure 15, the sleeve bears against the top face of the totalizer-casing, but when the bar is pushed in position of Figure 13, the sleeve is spring-pressed into the larger end of the slot 123 to hold the bar in totalizer-locking position.

The assembly of a series of totalizers upon the truck to overhang an actuating mechanism produces a severe torsional stress on the rail 79, which, up to this point, is resisted only by the closely-adjusted center roll 91 and bracket 92. To relieve said roll and bracket from this stress a center roll 127, Figures 4 and 6, is carried by a stud 128 secured to the end of a hanger 129, which is adjustably secured to the lower front face of each totalizer, as by a screw 130, the roll 127 being adjustable up and down for alignment within a U-shaped track 131 stationary with the actuator-frame. This adjustment once made is permanent for that totalizer and a particular actuating mechanism, and is the only adjustment required to render any factory-assembled and adjusted totalizer available for any actuating mechanism.

Means have been described to prevent the overhanging of the totalizers stressing the center roll 91, but there is another situation just as disastrous for the center roll, as when the carriage is at either extreme right or left position of the typing line where the truck 102 overhangs one end of the rail-section 71, and should an attempt be made to lift the machine by lifting the extended end of the truck, the truck would, in effect, become a lever to pry the roll 91 from the rail 79, and thereby destroy its adjustment. To prevent such misuse of the truck, the lower front edge of the rail-section is machined to form a ledge 132 parallel with the raceway 72 throughout the length of the rail. To coact with this stationary ledge 132 the bar 103 of the truck has secured to the lower rear face thereof throughout its length a rack-section 133 dropping below the lower edge of the bar with teeth along its lower edge for purposes to appear, and is further provided with a longitudinal rib 134 positioned to slide with the truck and under the ledge to resist any attempt to lift the truck from the rail-section 71 at any position of the truck.

The actuator-frame 70 is formed with a longitudinal recess 135 open at the front and inclosed by a rear wall 136 and end walls 137 to form a pocket to condensely house a rearwardly projecting section of the actuating mechanism that includes a shaft 138. Upon the shaft 138 there are mounted a series of camming actuators 139, one actuator for each numeral-key and each actuator formed with a tongue 140 to enter slots 141 cut through the rear wall 136 of the frame. These slots 141 are accurately milled and spaced relatively to the numeral-keys, and in guiding the tongue 140 of each actuator, locate and maintain each actuator upon the shaft 138 without the use of spacing washers. Each actuator is provided with an insertible hub 142 staked to the actuator and formed with a rim 143 to which a spring 144 is secured having an actuator-lifting tension from a pin 145 projecting from the face of the frame 70, to normally hold a stop-face 146 on each actuator against a machined face 147 on the frame.

Each actuator has pivoted at the side thereof, as at 148, a sheet-metal link 149 pendent therefrom with the lower end 150 extending below the plane of the keys. Each link may be removably held upon its pivot 148 by a spring-clip 151 secured to the face of the actuator to bear upon the end of the pivot outside the link in a well-known manner. The series of links 149 are guided by passing through slots 152 (see Figure 23) in a plate 153 arranged for sliding movement upon the top face of the cross-bar 57. Each slot 152 is formed with a clearance opening 154 through which the wider lower end 150 of the links 149 may be inserted sidewise up to a narrow neck 155, then turned a quarter around to lower a parallel section 156 into the slots 152, and the links may then be adjusted upon their pivots 148 and under the spring-clips 151.

As the actuators 139 are normally aligned by their stop-face 147, and it is desirable to maintain the keys 31 horizontally aligned without upsetting the key-levers 32, adjustable means are provided to compensate for variations in manufacture of the actuators 139, the links 149 and the key-levers 32. To this end, each numeral-key lever 32 is provided with a second rockable pivot-carrier 157 pivoted to the key-lever at 158 and rockably adjusted by set screws 159 to vibrate a stud 160 projecting from the face of an arm 161, forming a part of the carrier 157. Each projecting stud 160 enters a slot 162 in each link 149, and when the studs are finally adjusted to their slots, each link will be free to swing sidewise off the stud and become disconnected from its key-lever. To effect this side swing of the links 149, the slotted plate 153, which is guided by the screw-and-slot connections, is given a longitudinal movement upon the bar 57 against the tension of a spring 164. The forced movement of the plate 153 to the left of Figure 5 disconnects all the links 149 from their studs 160, and the actuators 139 and links 149 are held raised by their springs 144, and the numeral-keys 31 may be depressed without vibrating these parts of the actuating mechanism.

Figure 5:
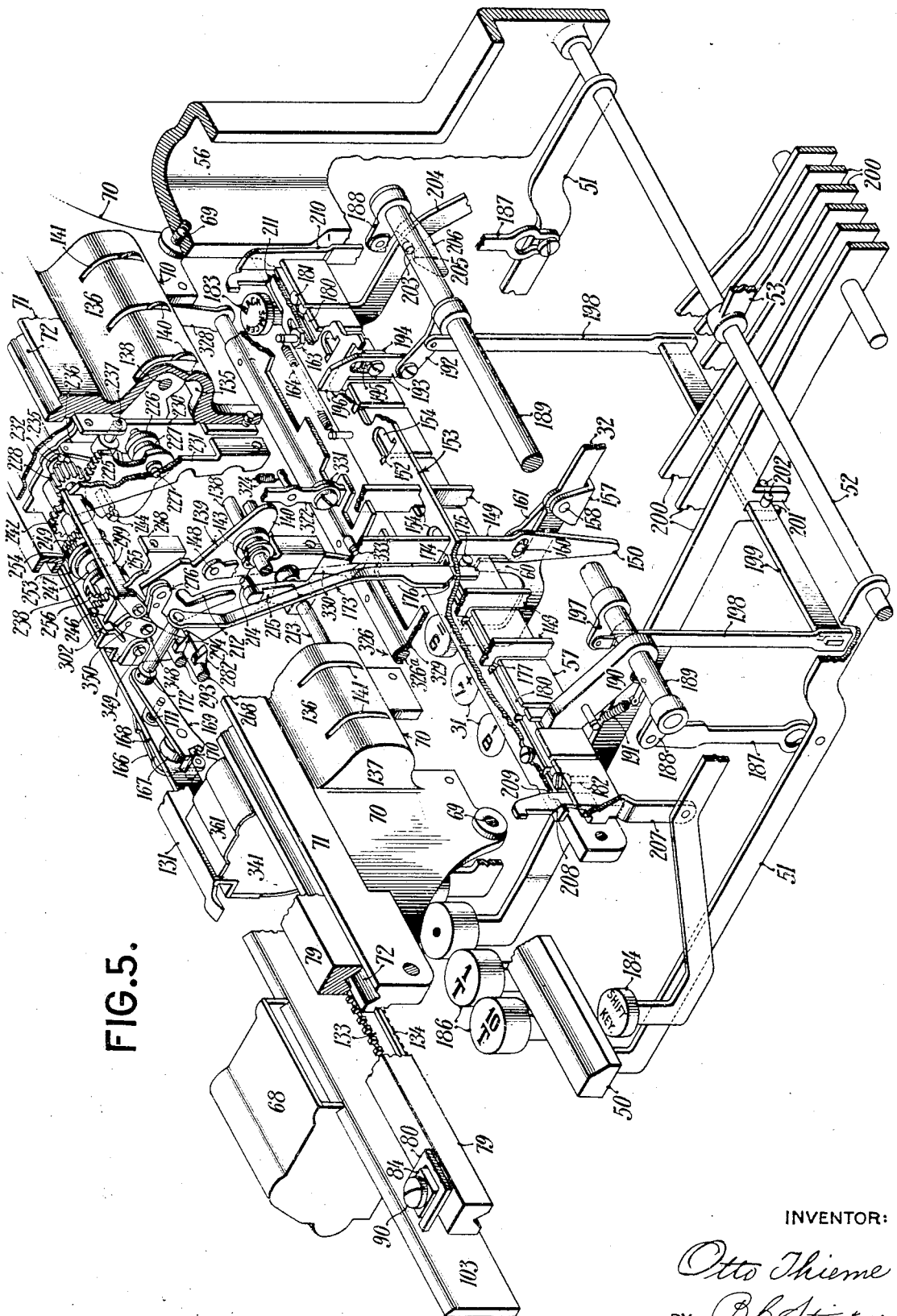
Figure 5 is a skeleton view, in perspective, of many co-operative parts, looking diagonally into the machine from a rear corner, many of the parts shown broken away for clearness.

Means to sever the connections between the numeral-keys 31 and the links 149 by means of the plate 153 include a bell-crank having a crank-arm 165 and a pointer-arm 166 to indicate the mechanical state of either "on" or "off" for the connections 149, see Figures 4 and 5. The bell-crank is secured to the end of a stud 167 having a bearing in a cross-bar 168 and secured to a lever 169 at the rear of said bar. The lever 169 is swingable with the crank-arm between stop-positions determined by a pin-and-slot connection 170 and held in either stop-position by a suitable detent 171. The free end of the lever has a long rod 172 secured thereto, which in turn pendently supports a connection 173 that is guided at the lower free end by a slot 174 in the plate 153 and by a pin 175 in the bar 57. The connection 173 is formed with a cam-face 176 to engage the end of the slot 174 that operates to shift the plate 153 and remove the links 149 from the key-lever driven studs 160 when the crank-arm 165 is shifted to the "off" position as at Figure 21.

It is necessary in all computing mechanisms to provide means to prevent the simultaneous depression of two numeral-keys, and this means, when engaged by the key-levers, is effective whether the computing connections are operative or inoperative, hence the fast typing of numerals is interfered with by these interlocking elements, and is objectionable. The present improvement provides interlocking elements to co-operate with the links 149, so that when said links are shifted to a non-computing position the numeral-keys are restored for their normal typewriter touch. To this end, each link is gouged out at one edge to form a face 177, normally within the plate 153 but clearing the bar 57 to pass downwardly through a slot 57ª in the bar when the associated key is depressed, see Figure 1.

To co-operate with the face 177 of each link 149, a series of round rods 180, see Figure 25, are arranged horizontally end to end within a groove 179 in the bar 57, as clearly disclosed in Figure 25, where the series of rods 180 have a slight longitudinal endwise movement between a fixed stop 181 and an adjustable stop 182 on said bar 57, said endwise movement being equal to the thickness of a link 149, and the divisions between the rods 180 being equal to the spacing of the links 149 and the ends of all the rods may be rounded to promote the entrance of a link between adjoining rod-ends. It will be noted in this figure that the upper surface of the rods 180 is flush with the top face of the bar 57, and when the plate 153 is assembled upon said bar the rods cannot be displaced from the groove 179.

It is not only necessary to prevent the depression of two numeral-keys, but it is also essential to prevent the depression of any numeral-key when other keys in the keyboard are depressed, such as the space-bar 50, a back-space key 183, and any tabulator-key 186, and these several keys are operative to close up the working gap between the rods 180 and prevent the depression of any link 149, as follows.

Each space-bar lever 51 is provided with a link 187 demountably secured thereto, see Figures 1, 4 and 5, and with the free end thereof pivotally connected to a crank-arm 188 operative to rock a shaft 189 having bearings in a pair of arms 190 extending rearwardly from bar 57, said shaft having a restoring spring 191 under tension between the pin on one of said arms 190 and a pin on the shaft 189. A crank-arm 192 is secured to the shaft 189 to vibrate a slide 193 for a vertical movement upon a bracket 194 secured to the bar 57, the slide having a slot and retaining-screw support 195 upon said bracket. The slide 193 is formed with a tongue 196 operable when depressed by the arm 192 to pass downwardly through a clearance slot in the plate 153 and wedge itself between two short rods 180ª to fill up the working gap in the series of rods. Hence, during the interval the space-bar is depressed the numeral-key links 149 are blocked by the rods 180.

The rock-shaft 189 also carries an arm 197 from which arm, and the arm 192, links 198 depend with their lower ends supporting a universal bar 199 underlying a series of levers 200 depressible by the denominational tabulator-keys 186. One of the levers 200 may have a pair of prongs 201 to straddle the bar 199, and the bar 199 may have a pair of pins 202 to straddle one of the prongs 201, see Figure 5, to prevent displacement of the bar relatively to the key-levers 200. When a tabulator-key 186 is depressed the shaft 189 is rocked to force the tongue 196 to spread the rods 180 as described for the space-bar.

The back-space key 183 operates to rock the shaft 189 to prevent the depression of a numeral key by means of a stud 203 set in a side of the back-space key-lever 204 to engage a cam-face 205 on an arm 206 fixed to said shaft.

The two case-shift keys 184 and 185, instead of locking the numeral keys 31 to prevent computive movements, operate to shift the slide-plate 153 to disconnect the computing mechanism from the numeral-keys, see Figure 5. The key 184 is pivotally connected to a slide 207 formed to take a vertical sliding bearing in the bar 57, and also formed with a cam-face 208 to pass through a suitable slot 209 in the slide-plate 153 and cam the edge of said slot to shift the plate 153 and disconnect the links 149 from all the numeral-key levers when the key is depressed.

Similarly, the depression of the shift-key 185 at the opposite side of the keyboard operates a slide 210 within the bar 57 and has a cam-face 211 to engage the end of the plate 153 to shift it in the same direction as by the key 184 when depressed.

The actuator-cams 139 are alike in size and shape, but the scope of the camming slots 212 varies with each actuator to enable each actuator, when vibrated by its numeral key, to convey a rocking motion to a universal shaft 213, equivalent to the numerical value of the key depressed; hence the uniform depression of all the numeral keys uniformly vibrates their actuators 139 a fixed extent, but the variations in the slots 212 convey differential rocking motions to the shaft 213 through each slot engaging a stud 214 carried by crank-arms 215 individual to each actuator and permanently mounted upon the shaft 213 in a straight uniform plane, as fully described by the aforesaid Kurowski patent.

The shaft 213 and its series of crank-arms 215 are at the driving end of a connected train of mechanisms operative to positively accomplish a definite result at the driven end of the train, while the actuator-cams are at the end of a driven train actuated by the numeral-keys. To compensate for slight variations between these assembled trains of manufactured parts, provision may be made for some form of a corrective adjustment. This adjustment may be of a character shown at Figure 3, where one of the arms 215 is secured to the shaft 213 by a stud-pin 216 with a stud-end projecting from said arm to be engaged by an eccentrically-mounted disk 217 secured to the adjacent face of the actuator-frame by a screw 218.

By adjusting the disk 217 to bear against the stud 216, the shaft 213 and its series of arms 215 may be minutely rotated either way to establish a normal position for the studs 214 relatively to the camming slots 212, the shaft-restoring spring 219 holding the stud 216 against the eccentric as a normal stop-position for the shaft and its connected train of mechanisms.

Secured to the shaft 213 is a short crank-arm 220, see Figures 1 and 4, operative to a drive a second crank-arm 221 loose upon the shaft but adjustably clamped to the arm 220 by a bolt-and-slot connection 222 of well-known form. The adjustment of the loose arm 221 to the shaft provides adjusting means between the driven train of mechanisms and the pre-adjusted rock-shaft 213 carrying the cam-actuated studs 214.

The free end of the arm 221 has a long stud 223, see Figure 4, projecting from the face thereof, upon which the lower end of a link 224 is mounted for both a pivotal and a sliding motion, and the upper end of said link is pivotally secured to a gear-sector 225 formed with a long hub 226 to provide a substantial bearing for the sector upon a shaft 227, see Figure 2. The sector 225 is slidable along the shaft 227, and when so moved, the link 224 is slidable along the stud 223, hence the close-assembling adjustments described to remove any clamping between the link 224 and the stud 223.

The sector 225 may be in train with a pinion 228 mounted for both a rotary and a sliding movement upon a shaft 229, which shaft, like the shaft 227, is assembled between brackets 230 and 231 assembled upon the frame 70. A hub 232 of the pinion 228, as well as the hub 226 of the sector 225, see Figure 2, are both formed with annular grooves 233 and 234 to receive studs 235 mounted upon opposite ends of a lever 236 secured to a shaft 237 assembled horizontally between the frame 70 and a front tie-bar 238 secured to the brackets 230 and 248 of the actuator-frame. The shaft 237 carries a detent arm 239 carrying a spring-pressed detent engageable with depressions in the rear face of the bar 238 to hold the shaft 237 and lever 236 at either of two state indicating shift-positions. To rock the shaft 237, the outer end thereof has a crank-arm 240 and a pointer 241 to indicate the computive state, as ADD or SUB, of the sector-driven trains, the rocking of the shaft effecting a simultaneous sliding movement of both sector 225 and pinion 228 in reverse directions.

The rocking of the shaft 237 to indicate a subtractive state, as at Figure 2, shows the pinion 228 in train with the master-gear driven pinion 242. By rocking the shaft 237 to indicate an additive state, the pinion 228 is withdrawn from the pinion 242 and the sector 225 engages with said pinion 242 by a side tooth entrance, whereby the pinion 242 will be driven directly by said sector, and the rotary direction of said pinion 242 will be reverse to the direction when driven by the pinion 228. The relation of the several parts is such that in shifting the parts from the Figure 2 positions the sector 225 will engage with the pinion 242 before the pinion 228 is wholly withdrawn from the pinion 242, and the teeth of the pinion 228 will engage with a stationary dog 243, see Figure 1, before said pinion is wholly withdrawn from the sector 225 to hold the alignment of the pinion 228 for re-engagement with the sector.

A feature of the invention prevents the shifting of the state control lever 240 while a numeral key is depressed. To this end, a lug 244 is secured to the frame-bracket 230 to project therefrom, and provided with a groove 245 to just clear the periphery of the sector 225. In the Figure 2 position the depression of a numeral-key rocks the sector which enters the groove 245 in the lug 244, and this interlock within the groove prevents shifting of the sector by the lever 240 for addition until the sector 225 is fully restored to its normal position upon the release of a numeral-key. When the mechanism is set for addition the sector will be shifted out of alignment with the groove 245 and just clear the end of the lug, and the end abutment of the lug against the face of the sector will prevent shifting of the gears back to the subtraction position of Figure 2 until the actuating numeral-key is restored.

The pinion 242 is the driven element for a train of parts that rotate the master-gear 246, see Figure 19, and are all supported upon a shaft 247 secured to said master-gear, and which rotates within bearings in the two brackets 230 and 248. The pinion 242 is formed integrally with a clutch-member 249 having an even number of slots 250 through the periphery thereof. The pinion 242 and its clutch-member 249 are spaced apart and rotate freely as a unit upon the shaft 247 between a collar 251 and a sleeve 252 flush with the end of the shaft 247. To co-operate with the clutch-member 249 there is mounted on the shaft 247 a clutch-member slidable along said shaft and having a head 253 formed with suitable clutching teeth 254 to interlock within the slots 250 of the clutch-member 249, a second head 255 having diametrically disposed tongues 256 to slidably engage within the slots 257 cut through a head 258 forming a part of the master-gear 246. The assembly of these parts, as shown at Figure 19, provides that the clutch-head 253 may be shifted leftward to force the teeth 254 into clutching interlock with the slots 250 of the member 249, but the tongues 256 are not withdrawn from the slots 257 of the master-gear.

It will be noted at Figures 8 and 19 that an annular groove 259 separates the two heads 253 and 255 of the sliding clutch-member, and within this groove 259 a roll 260, pivotally mounted upon the rear face of a crank-arm 261, operates to shift the clutch-member along the shaft 247. The arm 261 may be mounted upon a stud 262 secured to the rear face of the cross-bar 238, and said arm may include a second arm 263 carrying a stud 264 having a groove that rests within the forks 265 of a yoke 266 pivotally straddling the end of a lever 267 secured to a rock-shaft 268 having end bearings in the sides of the frame, to be described.

The opposite end of the lever 267 carries an anti-friction roll 269, see Figure 7, operative to roll upon a cam-face 270 forming the lower extremity of a lever 271 pivoted at 272 and held in normal position against the roll 269 by a spring 273, having one end secured to said lever and the other end secured to a stud 274 that engages within a slot 275 to guide the lower end of the lever 271.

The rock-shaft 268 is vibrated by the initial down stroke of each cam-actuator 139 to close the master-gear driving clutch before motion is transmitted to the gear-sector 225. To this end, each actuator 139 has a clutch-controlling tongue 276 secured at one end to the actuator by rivets 277, offset from the actuator by a spacer-block 278, see Figures 4 and 12, formed with an edge 279 concentric with the shaft 138 and terminating with a pointed round-nose 280 adjacent the shaft 268. Heretofore, the shaft 268 was formed with a longitudinal fin to be engaged by the nose of an actuator-tongue which was permanently fixed to the actuator, but in practice it developed that individual adjustment was required between each actuator and the shaft 268 to accurately time the closing of the master-gear clutch with a minimum of initial key-depression.

It will be noted that the tongues 276 are secured to the actuators 139 only at one end thereof, and that the shaft-rocking end 280 stands clear of the actuators to promote the use of a suitable adjusting tool to slightly bend the arcuate section of the tongues as a whole toward or from the shaft 268, and this slight offsetting of the end 280 results in a finely adjusted individual co-operation between the tongues 276 and individual dogs 282 on the rock-shaft 268, an adjustment that minutely times the master-gear driving clutch elements to the initial depression of the numeral keys.

The present shaft 268 at spaced-off positions aligned to the assembled positions of the tongues 276, see Figure 12, is flattened to provide seats for the adjustable dogs 282 formed with tapering, flat, faces 283, and round reduced shanks 284 to pass through the shaft while the threaded free ends may be provided with check nuts 285 to adjustably and removably secure the tongues to the shaft. Preferably these dogs 282 are formed from square stock to provide wide, long wearing, flat surfaces to be engaged by the tongues 276 of the actuators 139.

The shaft 268 and the assembled dogs are held in horizontal equilibrium by one or more horizontally-tensioned springs 286, in a known manner, to permit the shaft to be vibrated in opposite directions from a normal position The actuation of the tongues 276 by a depressed key causes the nose 280 thereof to engage its dog 282, rock the shaft 268 to a point where said nose rides off the point of the dog, and the shaft is held in this position by the dog wiping over the swinging arcuate edge 279 of the tongue 276 until the depression of the key has caused the camming actuator 139 to complete its driving motion to the sector 225, when the dog 282 will ride off the end 276ᵃ of the tongue, the spring 286 will restore the shaft 268 and its dogs, and with the cooperation of suitable spring 287 will restore the connections that vibrate the clutch-member of the master-gear.

The return swing of the tongue 276 will reversely rock the shaft 268 and dogs 282 idly, and to prevent this reverse rocking of the shaft vibrating the master-gear clutch-member, it will be remembered, see Figure 8, that the connection with the stud 264 is a fork, and the open slot thereof permits a down movement of said connection without vibrating the clutch-driving stud 264, in which case the spring 288 will yield.

The lever 271 vibrated by the lever 267, see Figure 7, may be formed with a tooth 289 operative to interlock with the teeth of the rack 133 of the totalizer-truck to hold the truck stationary with the actuator-frame 67 while any numeral key 31 is depressed. Said lever 271 is also formed with a dogging tooth 290 normally locking the master-gear 246, but operates to release said gear simultaneously with the shifting of the clutch-teeth 254 before rotating the master-gear, and said lever 271 is further formed with a master-dog 291 operative in a well-known manner to vibrate seriatim a series of levers 292 that control the carry-over devices of the totalizer.

The full-stroke device is similar to that shown by Kurowski, except that the rock-shaft 293, see Figure 12, is provided with sharp-pointed detenting dogs 294, having tapering flat faces 283, Figure 1, for co-operation with the fine peripheral teeth 295 of the actuators 139 and are removably secured to said shaft 293 in the manner described for the assembly of the dogs 282 upon the shaft 268, and similarly controlled by a spring 296, Figure 6.

It will be understood that the levers 292, upon which the carry-over devices 298 are mounted, are provided with the usual safe-guards, while the totalizer is passing through the computing position, Figures 6 and 17, such as a cross-bar 299 that prevents the actuation of any lever 292 except the lever aligned to the master-dog 291 by the carriage-feed, said bar 299 having a clearance slot 300 for the vibration of any lever that may be aligned to the master-dog; that the carrying-gears 301 have a tooth-positioning guide-tongue 302 on the actuator-frame bracket 248, see Figure 18, to align the teeth of the successive carrying gears 301 to the teeth of the master-gear 246 for a side entrance; that the pinion 228, when shifted to the extreme left of Figure 2, as for addition, where said pinion is wholly disconnected from the sector 225, is provided with a tooth-aligning dog 243, see Figure 1, to hold said pinion against tooth displacement relatively to the teeth of the sector 225.

The totalizer-mechanism is practically the same as that shown by Kurowski, including numeral-wheels 303, see Figure 12, idler gears 304, carrying gears 301, star-wheels 305, carry-over pinions 306, and an interlocking safety bar 307 operated by a nose 308 on the end of each lever 292 all assembled and operated similarly to the Kurowski disclosure.

Each numeral-wheel 303 is at the end of a train of gears driven by one of the carrying gears 301 which are driven seriatim by the master-gear 246, and a small working tooth-clearance must be provided between co-operating gears to promote a freedom of movement for a quick, snappy actuation of the numeral-wheels in computing. This slight looseness in the train in each denomination progressively multiplies through the successive carry-over connections to higher denominations in proportion to the denominational capacity of the totalizer, and the product of this looseness effects a spirality in the visible figures of the driven numeral-wheels between the lowest and highest denominational positions, as, for example, when the wheels disclose a series of "0" and "1" is subtracted, or when the wheels all disclose a "9" and "1" is added, the wheel of highest denominational order will partially disclose adjoining digits on the same wheel through lack of a complete carry-over movement at the end of the train, and requires corrective means to complete the carrying rotation of the wheels.

As the last wheel to be rotated by the master-gear is the units wheel, the teeth of the carrying gear 301 for the units wheel will always be in proper alignment regardless of how many carry-over devices are in train, and it is one purpose of the present invention to take advantage of this fact by lifting an aligning bar to first interlock between two adjoining teeth of the units gear 301, not horizontally but obliquely, so that the bar, when blocked by the end thereof bottoming between two adjoining teeth, will rise from an oblique to a horizontal position and progressively engage between the teeth of each successive gear 301 from units to the highest denomination after the typing of each numeral and before the numeral-key is released.

To this end, there is mounted upon the rear face of the channel-bar 131 a tooth-aligning bar or blade 309, see Figures 27, 28, 29 and 30, having a loose support at one end upon a pivot-stud 310 fixed to the bar 131 and held thereon by a nut 311 threaded upon the stud, see Figure 10. The nut and the stud have opposing beveled faces 312 adjacent the bar that the bar may assume a limitedly angular position at either side of the vertical. The opposite end of said bar 309 rests upon and is guided by a flanged stud 313, see Figure 11, riveted to the rear face of the channel-bar 131, said bar 309 having a hook 314 to rise and fall between the flanges of the stud 313 that also limits the movement of the bar 309. The bar 309 is also formed with an ear 315 to which there is connected the upper end of a bar-supporting link or carrier 316 that extends downward to pivotally connect at 317 with one end of a lever 318, Figure 30, fulcrumed at 319 to a bracket 320 secured to the frame 70. The rear end of the lever 318 is pivotally connected at 321 to a link 322 having a stud 323 from which a spring 324 extends to a pin 325 on the bracket 320 to restore the several parts to the Figures 6 and 11 positions, the stud 310 determining the normal positions of these parts.

326 indicates a universal bar, including a rock-shaft 326ª having end bearings within arms 328 secured to each side frame of the actuator and a long blade 329 riveted to said shaft. The blade or bar 329 is preferably made in two sections to provide for a center-bearing arm 330 between the two blades, Figure 17, to prevent the shaft from springing, and one blade may have an ear 331 secured thereto to which the lower end of the link 322 may be secured, as upon an adjustable eccentric pivot 332 of well-known form, to adjust the location of the blades 329 to a stud 333 projecting from the side face of each link-connection 149.

The depression of a numeral-key 31 to the full line position of Figure 26 completes the drive of the master-gear 246 to rotate a numeral-wheel 303 for a digit registry, and the driven stud 214 has entered a dwell 334 of the actuating slot 212, and the stud 333 on the link-connection 149 is in contact with the blade 329. The depression of the key 31 from the full line position toward the lower dotted position causes the stud 333 to vibrate the blade 329 and through intermediate connections first raises the aligning bar 309 from the Figure 27 position to the positions of Figure 28, where the free end of said bar has first engaged an aligning notch 335 formed in the side plate of the totalizer, and from this Figure 28 position and during the completion of the keystroke the linear displacement of the teeth of the gears 301 will be successively corrected by the wedging edge 336 of the bar camming the displaced teeth of each successive gear into absolute alignment between the aligning notch 335 and a companion notch 337 in the opposite side wall of the totalizer, as at the Figure 29 positions.

It will be noted at Figure 28 that the initial upward movement of the aligning bar 309 has been arrested by the engagement between the bar and the notch 335 in the right-hand side wall of the totalizer, but a spring 327 still holds the bar in a normal position relatively to its pivot 310, and as the key 31 continues to lift the aligning bar, said bar gradually rises from its oblique position of Figure 28 to the horizontal position of Figure 29, which position is equivalent to the lower dotted position of the key shown in Figure 26. The initial restoring movement of the key to the full line position of Figure 26 withdraws the aligning bar 309 to rest upon its stop-stud 313 under the tension of the spring 327, and the spring 324 will restore the universal bar 326.

From this description it will be seen that should the totalizer exhibit a linear series of "9", the depression of the "1" key adds the one to the units wheel, and should the key be held down at the end of its stroke the totalizer will exhibit a straight linear series of "0", while heretofore, spiral-removing devices have become effective only on the spring-tensioned return-movement of the key-lever. The present improvement places the burden of removing spirality from the series of numeral wheels upon the manual depression of the numeral-keys, and not upon a spring-tension which must be overcome by the depression of the key.

It will be understood that in a computing mechanism of this character the additive and subtractive state of the mechanism is determined by the direction of rotation transmitted from the actuating mechanism. Hence the spirality of the numeral-wheel will wind one way for addition and wind reversely for subtraction, requiring that the aligning bar have a compensating flexibility by rocking to either side of the perpendicular, as already described, to meet these conditions, especially where a large number of wheels are employed in the totalizer.

In a totalizer-mechanism having a long series of numeral-wheels the subtraction of a small number from a series of "0" reverses the carryover movements of the digits to exhibit a long line of "9" at the left of the number computed. The simultaneous reverse carrying from "0" to "9" on so many numeral-wheels indicates a certain resistance the depressed key must overcome, and this extra driving strain placed upon the connections between the key-lever and the master-gear makes it possible that the full depression of a key will not fully rotate the master-gear, and the driven numeral-wheel may not be fully rotated to its true register-aligning position, and the series of wheels may even be positioned where the aligning bar may be blocked by tooth interference.

To prevent such operating conditions, the camming slot 212 in each actuator 139 is formed with an overthrowing extension as 338, to overthrow the master-gear 246 and then restore said gear to its correct wheel-arresting position. In this manner the master-gear, which has an excess of rotary motion and which is subsequently withdrawn before the key is fully depressed, insures a true digital movement of the actuated numeralwheel regardless of any retarding influence of the driven parts.

This overthrowing or overfeeding extension 338 in the slot 212 of the actuator 139 is indicated at Figure 16 where the stud 214 has completed the overthrow of the master-gear 246 and rests upon the highest point of the extension 338 and is about to drop therefrom to the dwell 334 of the slot 212, which drop reverses the direction of rotation for the over-fed master-gear back to a fixed stop-position until released by the release of the depressed key. The initial restoring movement of the actuator-extension 338 vibrates the stud 214 and its connections in two directions, but these are idle motions because the master-gear 246 has been cut off by the opening of the clutch to the driving mechanisms.

It is a feature of the present invention to improve a known mechanism by redesigning some of the parts to meet the requirements of modern production methods, such as the preassembly of many of the parts into assembled stock-units that can be quickly and progressively assembled unit by unit to a main structure in time and labor saving sequence of operations performed progressively by adjoining assemblies at the same workbench, and also to provide means whereby these same units may be removed or replaced by the repair man in the field without necessarily stripping down many associated parts.

As an example of this feature, there is shown diagrammatically at Figure 17, a partial progressive assembly of the totalizer actuating mechanism. The frame 70 is fully machined, drilled and tapped for a stock-unit. Similarly the brackets 339, 230, 231, 248, 340 and 341 are stock-units, the three brackets 339, 248 and 341 having previously assembled corner blocks 342. The first assembly operation might consist of mounting these six brackets in position upon the frame 70 when the frame would pass to the next assembler for the assembly of other units within the brackets which might consist of pushing the shaft 229 through a hole 343 in the bracket 231 mounting the pinion 228 thereon and then seating the flattened end of the shaft within the irregular hole 344 up to the shoulder on the shaft, which aligns the opposite end of the rod flush with the bracket 231 but with the reduced end 345 thereof projecting from the face of said bracket. The bar 299 may now be assembled between the brackets 231 and 248 by sliding one end thereof upon the projecting reduced end 345 and securing the opposite end of the bar to the outer face of the bracket 248 by a screw 346 that threads into said bracket, and this single screw holds these several units into assembled relations. The frame 70 may now be passed to the next assembler who assembles with two clips 347 and 348 by partially threading the retaining screws 349 into the brackets 230 and 248, assembling the master-gear unit between the two brackets and then pressing the pivots 350 on each clip 347 and 348 into the end holes of the shaft 247 and firmly setting the two screws 349.

Other succeeding operations may include the assembly of the pivot ends of the two shaft units 293 and 268 within bearing holes in two carriers 351, and the combined assembled length equals the inside dimension of the two end brackets 339 and 341, and both carriers may be secured to said brackets by two screws 352 for each carrier; the assembly of the rock-shaft unit 213 into alignment with the holes 353 in the two end brackets 339 and 341, the adjustment of bushings 354 within said holes one at a time to receive the reduced ends of the shaft 213, and then the assembly of the universal bar 326 with its supporting arms 328 over the flanged ends of the bushings 354, and both arms and bushings are secured to the end brackets by screws 355 threaded into said brackets.

In this manner the actuating mechanism is progressively built up step by step by the successive assembling of pre-assembled stock-units, and such units that suffer most from wear may be readily dis-assembled by the repair man for repair or replacement.

A further example of an economical assembly for the pre-assembled units is shown at Figure 14, where one side wall of the totalizer-frame shows two irregular holes 356 to receive the flattened ends of two rods 357 and 358, the rod 357 carrying pre-assembled numeral-wheels 303 and the rod 358 carrying pre-assembled intermediate gears 304 with spacing collars 359 on each rod at the decimal position. The flattened ends of the two rods 357 and 358 are adjusted within the holes 356 up to their shoulders, the outer totalizer-plate assembled over the opposite round ends of said rods, and the collars 359 are set by screws 360, which prevents displacement of the rods from their holes in the totalizer-walls.

The final assembly of the actuating mechanism includes a top cover plate 361 and a plate 362 enclosing the front, and both detachably secured by screws. As there are noise-producing mechanisms within the actuating casing, especially between the full-stroke elements, it is desirable to line the two enclosing plates with sound-absorbing material 363, as shown in Figure 9.

As an example of reducing the number of parts in a known mechanism, the lever 271 performs three distinct functions during the initial depression of every numeral-key in computing, namely, the release of the master-gear for a driving rotation, the release of a carry-over mechanism to the wheel of next higher denomination and the locking of the totalizer-truck to prevent displacement thereof during the computing interval each numeral-key is depressed.

The actuators 139 have been described as having slots 212, and each slot as having an overthrowing formation 338, which overthrowing feature on a single actuator of any denomination will be found sufficient to reduce satisfactorily any spirality in the usual commercial totalizer, which is limited to seven denominations.

Variations may be resorted to within the scope of the invention, and portions of the improvements may be used without others.

Having thus described my invention, I claim:

1. In a computing machine, the combination of a totalizer having numeral-registering wheels, numeral-keys operable to turn said wheels, and a wheel-aligning blade universal to the keys and wheels and driven into engagement with all of the wheels by the depression of each key, after a computation effected during said key depression.

2. In a computing machine, the combination of a totalizer having gears and numeral-registering wheels, numeral-keys operable to drive the gears and turn said wheels, and a normally inoperative, horizontally-disposed aligning blade driven into engagement with the gears by the keys to progressively realign the register-wheels one after the other.

3. In a computing machine, the combination of a totalizer having gears and numeral-registering wheels, numeral-keys operable to drive the gears and turn said wheels, and an aligning blade automatically engaging the teeth of said gears by the pressure of any key, said blade being pivotally mounted intermediate its length, and being yieldably held at one end whereby the other end of the blade will engage the gears in advance of said one end.

4. In a computing machine, the combination of a totalizer having a series of gears, numeral-keys having means to rotate said gears, and an automatically operating aligning blade engageable with the gears, said blade having connections with all the numeral-keys so that each key when depressed will drive the bar into realigning engagement with the gears, first at one end of the series of gears and then at the other end of the series.

5. In a computing machine, the combination of a totalizer having a series of gears, numeral-keys having means to rotate said gears, an aligning blade engageable with the gears to realign them as a series after each computation thereof, and a train of connections between the aligning blade and the numeral-keys whereby the latter drive said blade, said train supporting the bar in horizontal equipose relative to the series of gears to automatically adjust itself to the gears before a final alignment thereof.

6. In a computing machine, the combination with a totalizer-mechanism including a series of gear-wheels driven computively by a key-actuated mechanism, of a key-driven tooth-aligning bar co-operative with said gear-wheels first at one end of the series of gears and then at the other end to progressively and automatically align the whole series of gears before the key is released, and automatically operating means for holding one end of said bar stationary until the other end is first advanced to engage the normally aligned end wheel of the series, said automatically operating means including a spring flexed by the advance of the bar after the co-action of the bar with said end wheel of the series.

7. In a computing machine, the combination of a totalizer-mechanism, including a series of gears, a series of numeral-keys, means to enable said keys to drive said gears in reverse direction for addition and subtraction, and an aligning blade universally driven by any key during a portion of the key stroke following a computing portion, to realign the series of gears, regardless of their direction of rotation when being computed.

8. In a computing machine, the combination of a totalizer-mechanism, including a series of gears, a series of numeral-keys having means operable to rotate said gears in reverse direction for addition and subtraction, and an aligning blade unversally operable by any key during a portion of the key stroke following a computing portion, to realign the series of gears, regardless of their direction of rotation when being computed, said blade having a slight transverse floating movement towards the direction rotated by the gears.

9. In a computing machine, the combination of a totalizer-mechanism, including a series of gears, a series of numeral-keys having means operable to rotate said gears in reverse directions for addition and subtraction, an aligning blade universally operable by any key during a portion of the key stroke following a computing portion, to realign the series of gears, regardless of their direction of rotation when being computed, said blade having a limited transverse floating motion from a central gear-aligning position towards the direction of gear-rotation, and means on the machine operable to centrally realign the blade to realign the series of gears.

10. In a computing machine, the combination of a totalizer-frame enclosing a series of gears, numeral-keys operable to rotate said gears, a swiveled aligning blade also driven by the keys, to engage and align the series of gears, and means on the frame, operable to realign the gears by aligning the blade on its swivel.

11. In a computing machine, the combination of a totalizer-frame enclosing a series of gears, numeral-keys operable to rotate said gears, an aligning blade also driven by the keys to engage the series of gears, and means on the frame, operable to realign the gears by aligning the blade first at one end thereof and then at the other end of the blade.

12. In a computing machine, the combination of a totalizer-mechanism, including a series of computing gears, numeral-keys operable to rotate said gears, a tooth-aligning blade parallel with said gears but normally inoperative thereto, and means connected with said aligning blade and operated by each key in such a manner that the depression of any key will first rotate the gears and then realign the gears before the key is released.

13. In a computing machine, the combination of a totalizer-mechanism, including a series of computing gears, numeral-keys operable to rotate said gears, a horizontally-disposed aligning blade normally disengaged from the teeth of the gears, and mechanism universal to the keys and having a single pivotal connection with said blade intermediate its length to support the blade, each key operating said mechanism to first lift the blade from its normal horizontal position, to an oblique semi-tooth-engaging position, and then continue to lift the blade to a full-tooth-engaging position to align the series of gears.

14. In a computing machine, the combination of a totalizer-mechanism, including a series of computing gears, numeral-keys operable to rotate said gears, a horizontally-disposed aligning blade normally disengaged from the teeth of the gears, and mechanism universal to the keys and having a single pivotal connection with said blade intermediate its length to support the blade, each key operating said mechanism to first lift the blade from its normal horizontal position, to an oblique semi-tooth-engaging position, and then continue to lift the blade to a full-tooth-engaging position to align the series of gears, said mechanism when so operated by a key being effective to hold the gears in alignment until the key is released, means being provided to restore the blade to its normal position upon release of the key.

15. In a computing machine, the combination of a totalizer-mechanism, including a series of computing gears, numeral-keys operable to rotate said gears, a horizontally-disposed aligning blade normally disengaged from the teeth of the gears, a train of mechanism having a bar at one end universally operated by the keys and a carrier at the other end to pivotally support the aligning blade intermediate its ends for a swinging movement, and stationary means operating automatically by the continuous rise of the carrier when a key is depressed, to swing the blade into positions that progressively align the teeth of the gears.

16. In a computing machine, the combination of a totalizer-mechanism, including a series of computing gears, numeral-keys operable to rotate said gears, a universal bar rockable by any key after the key has rotated the gears, an aligning blade normally disengaged from the teeth of the gears, and means operated by the universal bar and connected to the aligning blade in such a manner that the rocking of the bar will lift the blade into tooth-aligning engagement with the rotated gears.

17. In a computing machine, the combination of a totalizer-mechanism, including a series of computing gears, numeral-keys operable to rotate said gears, a universal bar rockable by any key after the key has rotated the gears to compute, and a tooth-aligning blade supported by means connected with said bar and operable when the bar is rocked by any key, to rotate the teeth of the gears into alignment.

18. In a computing machine, the combination of a totalizer-mechanism, including a series of computing gears, numeral-keys operable to rotate said gears, a universal bar rockable by any key after the key has rotated the gears to compute, and a tooth-aligning blade pivotally supported by said bar in a normally inoperative position parallel with the gears, but liftable into tooth-aligning engagement with the gears, by the rocking of the bar by the computing key.

19. In a computing machine having a stationary V-shaped runway with anti-friction rolls therein, the combination of a traveling totalizer-supporting truck having a rail of comparatively shallow height, means to guide said truck, including a V-shaped runway along the under side of said rail to travel upon said rolls, and a flat runway along the full top face of said rail, and a relatively stationary roller having a wide rolling face to bear upon the flat face of the rail to hold the truck in vertical equipoise upon the anti-friction rolls for a traveling movement thereof.

20. In a computing machine having a stationary runway and anti-friction devices therein, the combination of a truck including a rail of comparatively shallow height, guided by the anti-friction devices of the runway, a center roll on the stationary runway having a wide face to roll upon the rail of the truck to hold the rail down upon the anti-friction devices and prevent the truck swinging forwardly or rearwardly on said devices out of vertical equipoise, and means to prevent the abnormal lifting of the truck and stress said center roll to loosen the rail bearings, said means including a fin along the truck operable to ride under a ledge formed in the machine.

21. In a computing machine having a totalizer-frame, a truck formed with opposite clinching edges, said totalizer-frame having opposite vise-jaws gripping said clinching edges, thereby to mount the totalizer on the truck, one of the opposite jaws having the form of a lever pivoted to the body of the totalizer and provided with a key; and a rigid wedge having a key and mounted to slide between the lever jaw and a bearer upon the totalizer, to force said pivoted jaw down upon the edge of the truck and lock the jaws forcibly upon and against the truck edges; said wedge rigidly locking said lever against being loosened by its said key.

22. In a computing machine having a totalizer-frame, a truck formed with opposite clinching edges, said totalizer-frame having opposite vise-jaws gripping said clinching edges, thereby to mount the totalizer on the truck, one of the opposite jaws having the form of a lever pivoted to the body of the totalizer and provided with a key; a wedge having a key and mounted to slide between the lever jaw and a bearer upon the totalizer, to force said pivoted jaw down upon the edge of the truck and lock the jaws forcibly upon the truck edges; said wedge locking said lever against being loosened by its said key; and means for releasably latching said wedge in its effective position.

23. In a computing machine having a totalizer-frame, a truck formed with opposite clinching edges, said totalizer-frame having opposite vise-jaws gripping said clinching edges, thereby to mount the totalizer on the truck, one of the opposite jaws having the form of a lever pivoted to the body of the totalizer and provided with a key; a wedge having a key and mounted to slide between the lever jaw and a bearer upon the totalizer, to force said pivoted jaw down upon the edge of the truck and lock the jaws forcibly upon the truck edges; said wedge locking said lever against being loosened by its said key; and means for releasably latching said wedge in its effective position, said wedge having a stem, and said releasing means including a finger-latch mounted to rise and fall upon said stem, and said totalizer having a recess, and a spring for snapping said latch into said recess, to lock the wedge in effective position.

24. The combination with numeral-type-keys, differential mechanism operable thereby, of a toothed segment driven by the differential mechanism, a master wheel, and shiftable gear-connection to enable said segment to rotate the master wheel forwardly or backwardly, said shiftable gear-connection including means for shifting the segment laterally to and fro to reverse its operative connection to the master wheel, said segment having a shoulder, and a stop engageable by said shoulder to arrest the rotation of the segment when it is between adding and subtracting positions.

25. A combined typewriting and computing machine of the character described, having a traveling platen-carriage, a row of numeral-type-key levers below the carriage, computing mechanism, including a master wheel and numeral-indexing actuators therefor, disposed over the numeral-key levers for cooperation with a totalizer mounted on said carriage to traverse said master wheel, swingable links pendent from the indexing actuators and arranged at their lower ends for detachable connection to corresponding numeral-key levers, each link having a shoulder, a series of key-locking tumblers co-operative with the link-shoulders to permit operation of only one key at a time when the links and key-levers are connected, said shoulders and tumblers being arranged substantially below said computing mechanism, but above the numeral-key levers for ready accessibility to the key-locking devices formed thereby, and a cross-member operable to swing the links of disconnection from, or reconnection to, the numeral-key levers, said tumblers arranged so as not to interfere with said shoulders during the swing of the links.

OTTO THIEME.